United States Patent
Irisawa (10) Patent No.: US 7,415,966 B2
(45) Date of Patent: Aug. 26, 2008

(54) ENGINE

(75) Inventor: Yasuyuki Irisawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 55 days.

(21) Appl. No.: 11/340,767

(22) Filed: Jan. 27, 2006

(65) Prior Publication Data

US 2006/0201152 A1    Sep. 14, 2006

(30) Foreign Application Priority Data

Mar. 11, 2005 (JP) ............................. 2005-069470
Oct. 31, 2005 (JP) ............................. 2005-316541

(51) Int. Cl.
*F02B 7/00* (2006.01)

(52) U.S. Cl. ..................... 123/431; 123/326; 123/345; 123/347

(58) Field of Classification Search ......... 123/345–348, 123/305, 431, 90.15
See application file for complete search history.

(56) References Cited

U.S. PATENT DOCUMENTS

| | | | | |
|---|---|---|---|---|
| 5,421,296 | A * | 6/1995 | Hitomi et al. ........... | 123/184.53 |
| 6,519,933 | B2 * | 2/2003 | Ogiso et al. ............ | 60/285 |
| 6,561,157 | B2 * | 5/2003 | zur Loye et al. ......... | 123/295 |
| 6,684,849 | B2 * | 2/2004 | zur Loye et al. ......... | 123/295 |
| 6,907,870 | B2 * | 6/2005 | zur Loye et al. ......... | 123/594 |
| 2002/0007816 | A1 * | 1/2002 | Zur Loye et al. ........ | 123/295 |
| 2003/0084876 | A1 | 5/2003 | Stanglmaier | |
| 2005/0000486 | A1 * | 1/2005 | Kazuyama et al. ....... | 123/299 |
| 2005/0066939 | A1 * | 3/2005 | Shimada et al. ......... | 123/431 |
| 2005/0097888 | A1 | 5/2005 | Miyashita et al. | |
| 2006/0037582 | A1 * | 2/2006 | Adachi et al. ........... | 123/305 |

FOREIGN PATENT DOCUMENTS

| | | |
|---|---|---|
| EP | 1 531 249 A | 5/2005 |
| JP | 11-351041 | 12/1999 |
| JP | 2001-263015 | 9/2001 |
| JP | 2002-048035 | 2/2002 |
| JP | 2002-242713 | 8/2002 |
| JP | 2003-247443 | 9/2003 |

* cited by examiner

*Primary Examiner*—Thomas Denion
*Assistant Examiner*—Douglas J. Duff
(74) *Attorney, Agent, or Firm*—Oliff & Berridge, PLC

(57) ABSTRACT

An engine includes an in-cylinder injector injecting fuel into a cylinder, a port injector injecting fuel into an intake manifold, and a valve-opening-characteristic changing mechanism changing at least lift or opening duration of an intake valve. When the engine is in a predetermined operating region and the valve-opening-characteristic changing mechanism decreases the lift or the opening duration of the intake valve, the ratio of fuel injected by the in-cylinder injector is increased according to an amount of the decrease of the lift or the opening duration and accordingly a decrease in tumble ratio is compensated for by the injection flow.

10 Claims, 9 Drawing Sheets

ENGINE

This nonprovisional application is based on Japanese Patent Applications Nos. 2005-069470 and 2005-316541 filed with the Japan Patent Office on Mar. 11, 2005 and Oct. 31, 2005, respectively, the entire contents of which are hereby incorporated by reference.

BACKGROUND OF THE INVENTION

1. Field of the Invention

The present invention relates to an engine, and particularly to an engine having an in-cylinder injector injecting fuel into a cylinder and a port injector injecting fuel into an intake manifold or intake port and having a valve-opening-characteristic changing mechanism.

2. Description of the Background Art

Generally, a so-called dual-injection engine is known that has an in-cylinder injector for injecting fuel into a cylinder and a port injector for injecting fuel into an intake manifold or intake port, and that alternately uses these injectors according to the operating state of the engine to achieve, for example, stratified charge combustion when the engine is in a low-load operating region and homogeneous charge combustion when the engine is in a high-load operating region, or simultaneously uses these injectors at a predetermined fuel-injection ratio to improve such characteristics as fuel-economy and output.

Further, a dual-injection engine that is of the type as described above and that has such a supercharger as turbocharger is also known from, for example, Japanese Patent Laying-Open No. 11-351041.

This engine with the supercharger disclosed in Japanese Patent Laying-Open No. 11-351041 changes the ratio between the quantity of fuel injected from the in-cylinder injector and that from the port injector according to a supercharge pressure. Specifically, when the engine is in a steady-state mode in a high supercharge pressure region, the ratio of the quantity of fuel injected from the port injector is increased while the ratio of the quantity of fuel injected from the in-cylinder injector is decreased. When the temperature of the leading end of the in-cylinder injector increases to be equal to or higher than a predetermined value, the ratio of the quantity of fuel injected from the in-cylinder injector is made higher than that applied when the engine is in the steady-state mode. In this way, a homogeneous air-fuel mixture is generated in a combustion chamber to improve combustion efficiency and prevent deposits from accumulating in the in-cylinder injector.

Regarding a lean-burn engine with a supercharger that has the valve-opening-characteristic changing mechanism, it is considered to implement output torque control for a lean region corresponding to middle to low speed and middle to low load region, in view of improvements in fuel economy as well as reduction of exhaust emissions, especially reduction of NOx for example, by controlling the quantity of intake air according to the degree of opening of the throttle valve, and further by controlling the quantity of intake air through control of the valve lift or valve-opening duration and the close timing of the intake valve in the state where the throttle valve is fully open without pumping loss, and controlling the quantity of intake air through control of the pressure generated by supercharging of the supercharger, for example. It is expected that the above-described control of the quantity of intake air through control of the valve lift or valve-opening duration of the intake valve in the state where the throttle valve is fully open provides a large tumble flow, namely high tumble ratio of the intake air into the combustion chamber to extend the lean limit.

Figure 3:
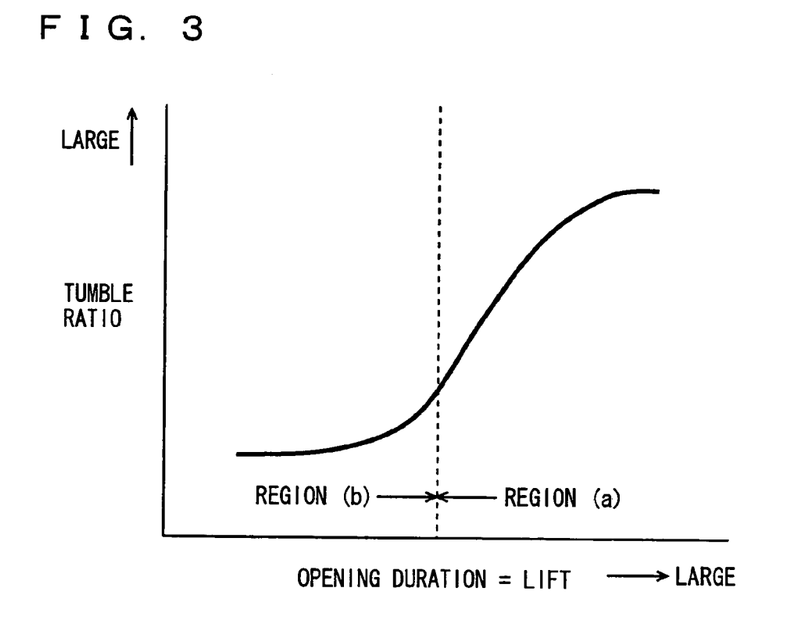
FIG. 3 is a graph showing a relation between the valve-opening duration or valve lift and the tumble ratio.
Figure 4:
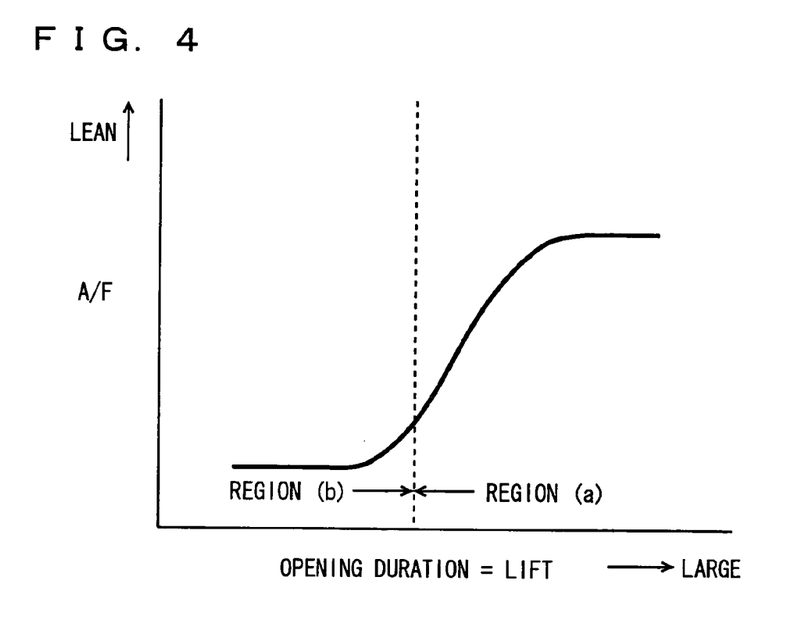
FIG. 4 is a graph showing a relation between the valve-opening duration or valve lift and the required air-fuel ratio (A/F).

However, as seen from the relation between the tumble ratio and the valve lift or valve-opening duration of the intake valve shown in FIG. 3, substantially in proportion to the decrease in valve lift or valve-opening duration of the intake valve, the tumble ratio decreases. Thus, if the valve lift or valve-opening duration of the intake valve is decreased, the tumble ratio necessary for lean burn cannot sufficiently be achieved. Then, due to the decrease in tumble ratio, it becomes inevitable to set the control air-fuel ratio to be rich, as shown by the relation in FIG. 4 between the valve lift or valve-opening duration of the intake valve and the required air-fuel ratio. Consequently, a problem occurs that the fuel economy deteriorates and exhaust emissions, especially NOx deteriorate.

SUMMARY OF THE INVENTION

An object of the present invention is to provide an engine with which the above-described problems are solved, deterioration of lean burn due to a decrease of the tumble ratio can be prevented to improve fuel economy, and NOx can be reduced. It is noted that Japanese Patent Laying-Open No. 11-351041 is silent about such an object.

According to an embodiment of the present invention, an engine includes: an in-cylinder injector injecting fuel into a cylinder; a port injector injecting fuel into an intake manifold; a valve-opening-characteristic changing mechanism capable of changing at least one of lift and opening duration of an intake valve; and a fuel injection control unit increasing, when the engine is in a predetermined operating region and the valve-opening-characteristic changing mechanism decreases at least one of the lift and the opening duration of the intake valve, the ratio of fuel injected by the in-cylinder injector according to an amount of the decrease of at least one of the lift and the opening duration. Here, the engine may be a supercharger-mounted lean-burn engine.

Until a supercharge pressure reaches a predetermined pressure, the ratio of fuel injected by the in-cylinder injector may be increased according to the magnitude of the supercharge pressure.

When the supercharge pressure exceeds the predetermined pressure, the ratio of fuel injected by the in-cylinder injector may be fixed.

The engine may further include an overlap changing unit that increases, when the engine is in a predetermined operating region and the valve-opening-characteristic changing mechanism decreases at least one of the lift and the opening duration of the intake valve, the amount of overlap by changing open/close timing of an exhaust valve.

Regarding the engine of the embodiment of the present invention, regardless of the presence/absence of the supercharger, when the engine is in a predetermined operating region and at least one of the lift and the opening duration of the intake valve is decreased by the valve-opening-characteristic changing mechanism, the fuel injection control unit increases the ratio of fuel injected by the in-cylinder injector according to the amount of decrease of at least one of the lift and the opening duration. Accordingly, the quantity of fuel injected into the cylinder is increased according to the amount of decrease of at least one of the lift and the opening duration. The injection flow thus increased serves as a supplement to the tumble flow decreased due to the decrease of one of the lift and the opening duration of the intake valve, so that the fuel economy is improved and NOx is decreased. It is noted that the engine of the present invention is not limited to a lean-burn engine.

Here, in the case where the engine includes a supercharger, until the supercharge pressure reaches a predetermined pressure, the ratio of fuel injected by the in-cylinder injector is increased according to the magnitude of the supercharge pressure. Thus, until the predetermined supercharge pressure is reached, the fuel injection control unit increases the ratio of fuel injected by the in-cylinder injector according to the magnitude of the supercharge pressure. Accordingly, until the predetermined supercharge pressure at which a tumble ratio necessary for lean burn is reached, the quantity of fuel injected by the in-cylinder injector is increased according to the magnitude of the supercharge pressure. Therefore, the increased injection flow serves as a supplement to the tumble flow when the supercharge pressure is low, so that lean burn is maintained, fuel economy is improved and NOx is reduced.

Further, when the supercharge pressure exceeds a predetermined pressure, the ratio of fuel injected by the in-cylinder injector is fixed. Thus, when the supercharge pressure exceeds a predetermined pressure, the fuel injection control unit fixes the ratio of fuel injection by the in-cylinder injector. Accordingly, while the quantity of fuel injected into the cylinder is fixed, the supercharge pressure that exceeds the predetermined pressure provides a sufficient tumble ratio to accomplish lean burn at a leaner air-fuel ratio.

Furthermore, the engine may further include the overlap changing unit that increases the overlap, when the engine is in a predetermined operating region and the valve-opening-characteristic changing mechanism decreases at least one of the lift and the opening duration of the intake valve, by changing the open/close timing of the exhaust valve. In this way, internal EGR can be used to further reduce NOx. In addition, influences on the actual compression ratio can be prevented that are due to the change of the open/close timing of the intake valve. Moreover, the retarded opening of the exhaust valve provides the advantage of a high compression ratio, and thus the fuel economy can further be improved and NOx can further be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, the best modes for carrying out the invention are described in detail with reference to the drawings.

Figure 1:
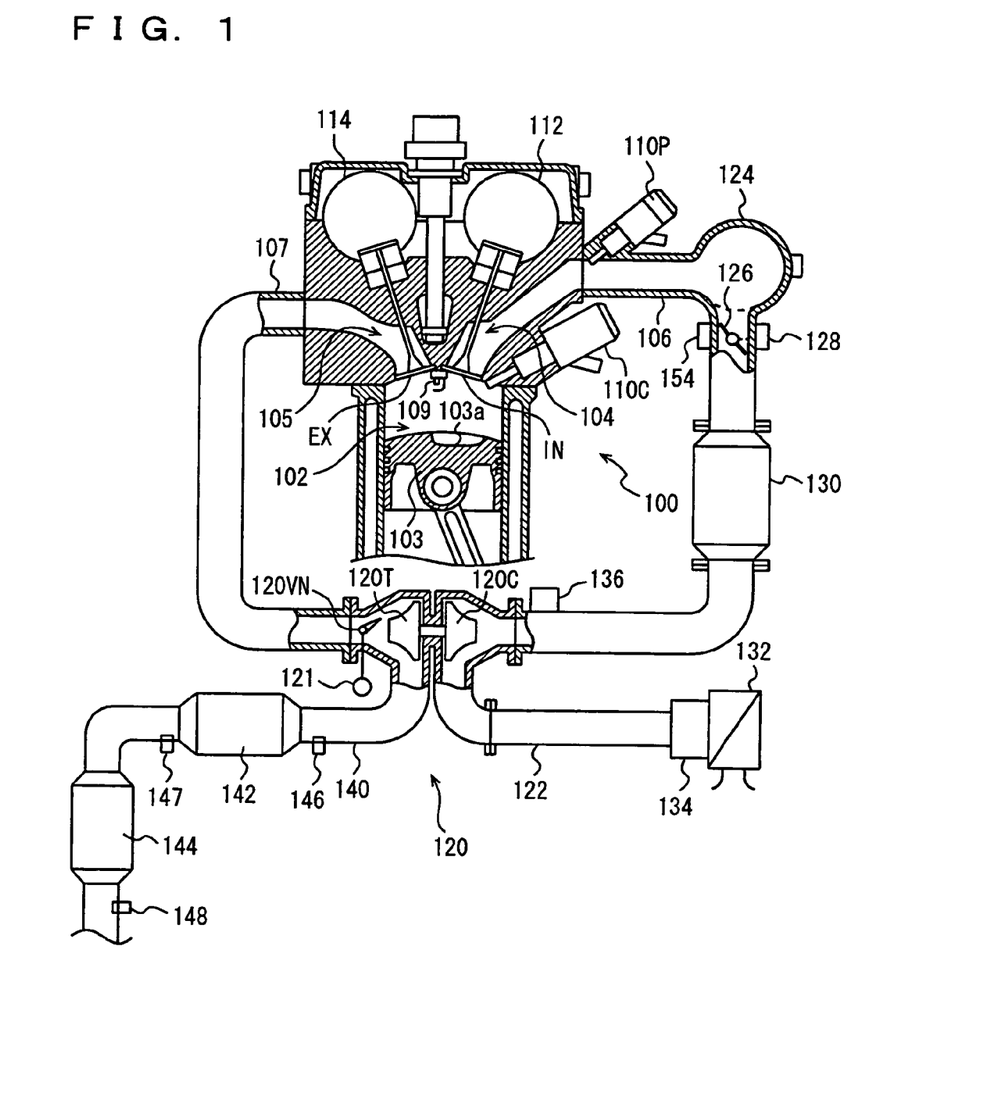
FIG. 1 shows the entire system structure of an engine according to first and second embodiments of the present invention.

FIG. 1 diagrammatically shows a system structure generally illustrating a supercharger-mounted lean-burn engine having a turbocharger as the supercharger, to which first and second embodiments of the present invention are applied. Engine 100 shown in FIG. 1 is constructed as multi-cylinder engine (for example four-cylinder engine, however, only one cylinder is shown in FIG. 1), burning an air-fuel mixture in each combustion chamber 102 to reciprocate a piston 103 and thereby derive motive power from a crankshaft (not shown). It is noted that the engine may not have the supercharger.

Each combustion chamber 102 of engine 100 communicates with an intake port 104 and an exhaust port 105. To intake port 104, an intake manifold 106 is connected. To exhaust port 105, an exhaust manifold 107 is connected. In the cylinder head of engine 100, an intake valve IN for opening/closing intake port 104 as well as an exhaust valve EX for opening/closing exhaust port 105 are provided for each combustion chamber 102. Engine 100 further has spark plugs 109 of the number corresponding to the number of cylinders. Spark plug 109 is provided in the cylinder head to face toward the inside of its associated combustion chamber 102.

In engine 100 of the present invention, a port injector 110$p$ injecting and supplying fuel into intake port 104 as well as an in-cylinder injector 110$c$ directly injecting and supplying fuel into combustion chamber 102 are provided. Engine 100 has in-cylinder injectors 110$c$ of the number corresponding to the number of cylinders. Each in-cylinder injector 110$c$ is capable of directly injecting such a fuel as gasoline into its associated combustion chamber 102 and connected through a fuel delivery pipe to a fuel tank holding such a liquid fuel as gasoline (these components are not shown). Further, the above-described port injector 110$p$ is capable of injecting such a fuel as gasoline into its associated intake port 104 and connected through a fuel delivery pipe (not shown) to the aforementioned fuel tank. At least one in-cylinder injector 110$c$ is provided per combustion chamber 102.

Here, in engine 100 of the present invention, intake valve IN is opened/closed by an intake valve mechanism 112 having a variable lift mechanism and a variable valve timing mechanism that allow valve-opening characteristics including the valve lift or valve-opening duration as well as the open/close timing of intake valve IN to be changed. Exhaust valve EX is opened/closed by an exhaust valve mechanism 114 having a variable valve timing mechanism that allows valve-opening characteristics including at least the open/close timing to be changed. Here, intake valve mechanism 112 can be implemented by a known valve-opening-characteristic control apparatus that is structured to include an intermediary drive mechanism disclosed in Japanese Patent Laying-Open No. 2001-263015 for example. Further, exhaust valve mechanism 114 is also known. Therefore, instead of a detailed description of them, a simple description is given in the following.

As to the valve lift or valve-opening duration and the open/close timing, the valve lift or valve-opening duration is changed by the variable lift mechanism while the open/close timing is changed by the variable valve timing mechanism.

Intake valve IN is lifted by an intake cam via the intermediary drive mechanism of the valve-opening-characteristic control apparatus and a rocker arm. The position of a control shaft of the intermediary drive mechanism is controlled so as to control the drive duration by the intake cam and control the valve lift and the range of degrees of the angle from an open timing to a close timing, namely the valve-opening duration of intake valve IN. Further, the intake cam is attached to an intake camshaft and the phase of the intake camshaft is made variable to change the open/close timing of intake valve IN. It is noted that, as long as a transversely symmetrical intake cam is employed, the valve lift and the valve-opening duration are in such a relation that the valve-opening duration decreases as the valve lift decreases. Therefore, in the following description, one of these factors may be used in some cases.

Similarly, exhaust valve EX is lifted by an exhaust cam via a rocker arm. The exhaust cam is attached to an exhaust camshaft, and the phase of the exhaust camshaft is made variable to change the open/close timing of exhaust valve EX. Here, the open/close timing of intake valve IN and exhaust valve EX discussed above is changed by changing the phase of each of the intake camshaft and the exhaust camshaft. Therefore, according to the advance angle or retard angle of respective phases of these camshafts with respect to a reference position, the open/close timing is changed while the valve-opening duration is kept constant.

Piston 103 of engine 100 is structured to be of the so-called deep bowl type with its top where a concave 103a is formed. In engine 100, in the state where air is taken into each combustion chamber 102, such a fuel as gasoline can directly be injected from each in-cylinder injector 110c toward concave 103a of piston 103 in each combustion chamber 102. Accordingly, in engine 100, a rich air-fuel mixture layer is generated near spark plug 109 separately from a surrounding lean air-fuel mixture. Thus, a considerably lean air-fuel mixture can be used to accomplish combustion in a stable state.

Engine 100 of the present invention has a turbocharger 120. Turbocharger 120 uses energy of exhaust gases supplied into a turbine 120T provided on an exhaust passage to drive a compressor 120C provided on an intake passage so as to achieve supercharging. The turbocharger includes a supercharge control apparatus that is a variable nozzle 120VN serving as a variable flow mechanism at an inlet nozzle portion of turbine 120T. This variable nozzle 120VN is driven by a variable-nozzle operating actuator 121 structured to include such an electrically-driven actuator as DC motor to take any of the "full-close" position, the "full-open" position and an intermediate position therebetween. Here, "full-close" of the variable nozzle refers to the state in which the nozzle is closed to have the minimum flow area by a variable vane which is a component of the variable nozzle while "full open" of the variable nozzle refers as well to the state where the nozzle is opened to have the maximum flow area. Here, the supercharge control apparatus may be implemented by a wastegate valve provided on a bypass path allowing the inlet side and the outlet side of turbine 120T to communicate with each other.

Further, on intake passage 122 connected to intake manifold 106, a surge tank 124 is provided. On the upstream side thereof, a throttle valve 126 adjusting the quantity of intake air is provided. Throttle valve 126 is a so-called electronically-controlled throttle valve and is driven by a throttle motor 128. The inlet of intake passage 122 is provided with an air filter 132. On the downstream side of the filter, an airflow meter 134 for detecting the quantity of intake air is provided. On the downstream side of compressor 120C, an intercooler 130 for cooling intake air is provided. Further, on the downstream side of compressor 120C of intake passage 122, a supercharge pressure (intake air pressure) sensor 136 is provided.

On the downstream side of turbine 120T of turbocharger 120, an exhaust pipe 140 is connected. On the passage of exhaust pipe 140, a three-way catalyst 142 for warming up for example as well as an NOx catalyst 144 for processing NOx in a lean-burn state are provided. With these catalyst devices, exhaust gasses from each combustion chamber 102 are cleaned. In the present embodiment, a whole-area air-fuel ratio sensor 146 is provided immediately downstream of turbine 120T for detecting the air-fuel ratio of exhaust gases. Further, on the downstream side of three-way catalyst 142, a first oxygen sensor 147 is provided. Furthermore, on the downstream side of NOx catalyst 144, a second oxygen sensor 148 is provided. These whole-area air-fuel ratio sensor 146 and the first and second oxygen sensors 147, 148 for detecting the characteristics and state of exhaust gases may herein collectively be referred to as an exhaust sensor 149.

Figure 2:
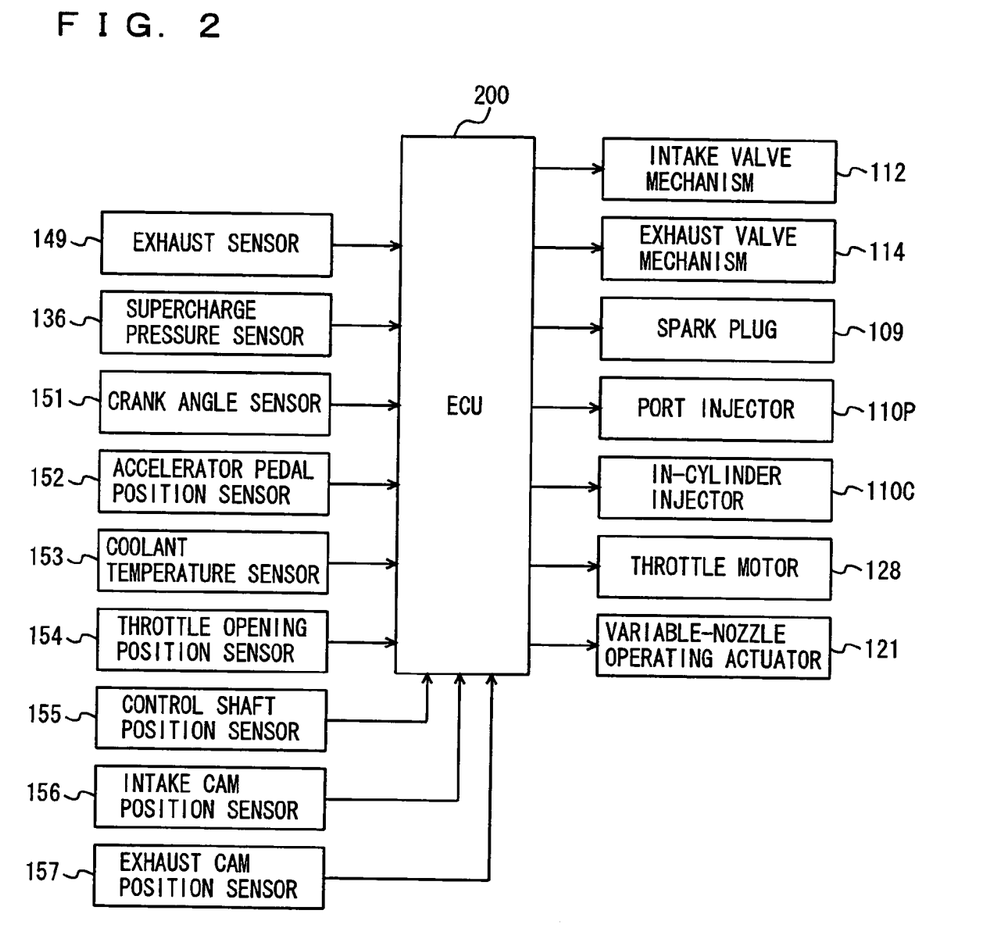
FIG. 2 is a block diagram showing an electrical structure of the embodiments of the present invention.

Engine 100 has its control system structured as shown in FIG. 2. Engine 100 includes an electronic control unit (hereinafter "ECU") 200 serving as control means. ECU 200 includes such storage devices as CPU, ROM, RAM and input/output port as well as backup RAM storing for example various information and maps. To the input port of ECU 200, various sensors are connected, through an A/D converter (not shown), such as exhaust sensor 149 including air-fuel ratio sensor 146 as described above and supercharge pressure sensor 136, a crank angle sensor 151 provided in the vicinity of the crankshaft of engine 100, an accelerator pedal position sensor 152 detecting the degree to which the accelerator pedal is depressed, a coolant sensor 153 detecting the temperature of the engine coolant, a throttle opening position sensor 154 detecting the degree of opening of throttle valve 126, a control shaft position sensor 155 for controlling valve-opening characteristics of intake valve mechanism 112, an intake cam position sensor 156, and an exhaust cam position sensor 157 for controlling exhaust valve mechanism 114. ECU 200 receives respective detection signals of these sensors to obtain respective detection values. Further, to the output port of ECU 200, the above-described intake valve mechanism 112, exhaust valve mechanism 114, spark plug 109, injectors 110c, 110p, throttle motor 128, various actuators such as variable-nozzle operating actuator 121 are connected through a D/A converter (not shown).

ECU 200 uses various maps, reference values, set values for example that are stored in the storage devices and, based on the information and the detection values of the sensors for example, controls such engine operating parameters as the quantity of fuel injected by as well as the fuel injection ratio between injectors 110c and 110p, the timing of ignition by spark plug 109, the degree to which the throttle valve is opened by throttle motor 128, the supercharge pressure generated by variable-nozzle operating actuator 121, and the valve lift or valve-opening duration and the open/close timing of intake valve IN effected by intake valve mechanism 112, and the open/close timing of exhaust valve EX effected by exhaust valve mechanism 114. In particular, in the storage devices of ECU 200, maps representing operating-state regions of engine 100 are stored like the map shown in FIG. 5 with the vertical axis representing the accelerator pedal travel (required load indicated by the degree of depression of the accelerator pedal that is detected by accelerator pedal position sensor 152) and the horizontal axis representing the engine speed (the engine rotational speed detected by crank angle sensor 151). On the maps, an optimum value is set that is determined experimentally for the aforementioned control according to required characteristics of engine 100, and these maps are stored in the storage devices of ECU 200.

Figure 5:
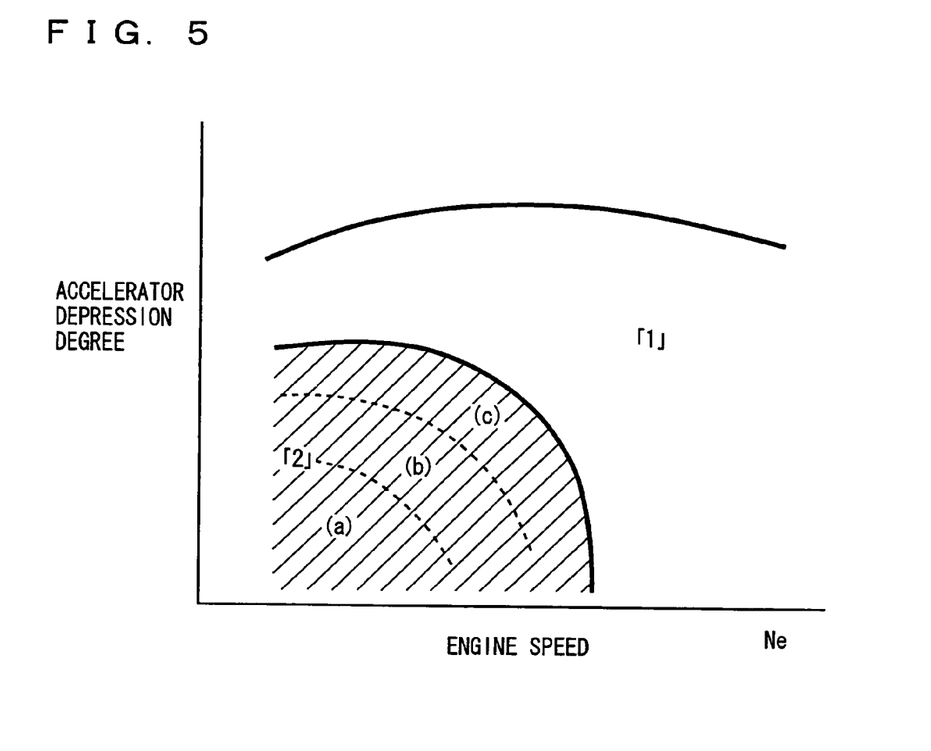
FIG. 5 is a graph showing an exemplary engine operating-region map used in the embodiments of the present invention.

Here, an example of the output torque control when engine 100 of the present invention is in a lean-burn region is described with reference to the engine operating-state region map in FIG. 5. For this engine 100, control is performed separately for a combustion region according to the stoichiometric ratio (hereinafter stoichiometric) where the accelerator pedal is depressed to a large degree, namely the region is high-load and high engine rpm or high engine speed region (the combustion region being indicated as stoichiometric region "1" in FIG. 5) and for a combustion region according to a lean air-fuel ratio corresponding to the remaining middle to low load region and the middle to low speed region (lean-burn region indicated as lean region "2" in FIG. 5). For this lean region "2", basically fuel is injected from port injector 110*p* to generate a homogeneous lean air-fuel mixture in combustion chamber 102 and the aforementioned output torque control is performed separately for the following three regions (a), (b) and (c): super low load and super low speed region (a); low load and low speed region (b); and middle load and middle speed region (c).

Figure 6:
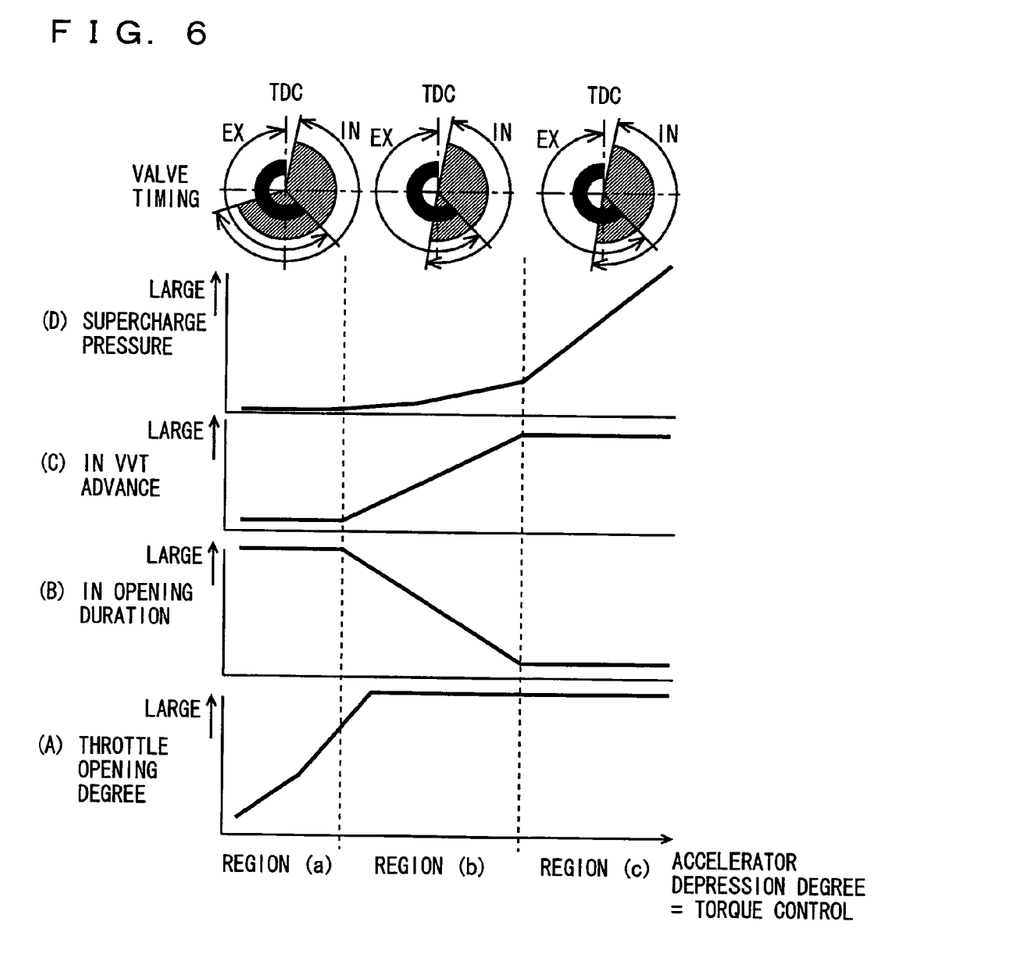
FIG. 6 is a graph illustrating exemplary basic output torque control for a lean-burn region of a supercharger-mounted lean-burn engine in the embodiments of the present invention.

For these regions, as shown in FIG. 6 for example, engine operating parameters are set that are for example (A) degree of opening of the throttle valve, hereinafter throttle opening degree, (B) valve lift or valve-opening duration of intake valve IN (represented as "IN opening duration" in FIG. 6), (C) amount of advance of the open/close timing of intake valve IN (represented as "IN VVT" in FIG. 6), and (D) supercharge pressure. Specifically, for region (a), according to an increase in accelerator depression degree, namely increase in required output torque, the throttle opening degree is substantially linearly increased for controlling the quantity of intake air. At this time, the valve lift or valve-opening duration of intake valve IN is kept to be a large lift or a long opening duration. As indicated as the valve timing at the top of FIG. 6, the open timing is substantially immediately after the top dead center (TDC) and the close timing is remarkably delayed after the bottom dead center (BDC). The amount of advance of the open/close timing is made small, namely retarded with respect to the normal one. Thus, fuel economy in the Atkinson cycle is improved. The supercharge pressure is substantially zero since exhaust energy is insufficient when the engine is operating in this region (a).

For region (b), while the accelerator depression degree is increased, the throttle valve is substantially kept full-open and the valve lift or valve-opening duration of intake valve IN is decreased as the accelerator depression degree increases and the open/close timing (IN VVT) is changed (advanced), so that the valve is opened immediately after the top dead center and closed somewhat later than the bottom dead center to control the quantity of intake air. Further, for region (c), the state for the control for region (b) is maintained while the supercharge pressure is increased as the accelerator depression degree increases so as to control the quantity of intake air.

Regarding engine 100 of the present invention, according to the above-described basic output torque control, lowering of the lean limit that is caused by a lowered tumble ratio due to a decrease in lift or opening duration of intake valve IN is prevented by effectively using injection flow by in-cylinder injector 110*c* so as to improve fuel economy and reduce exhaust emissions, particularly NOx.

Figure 7:
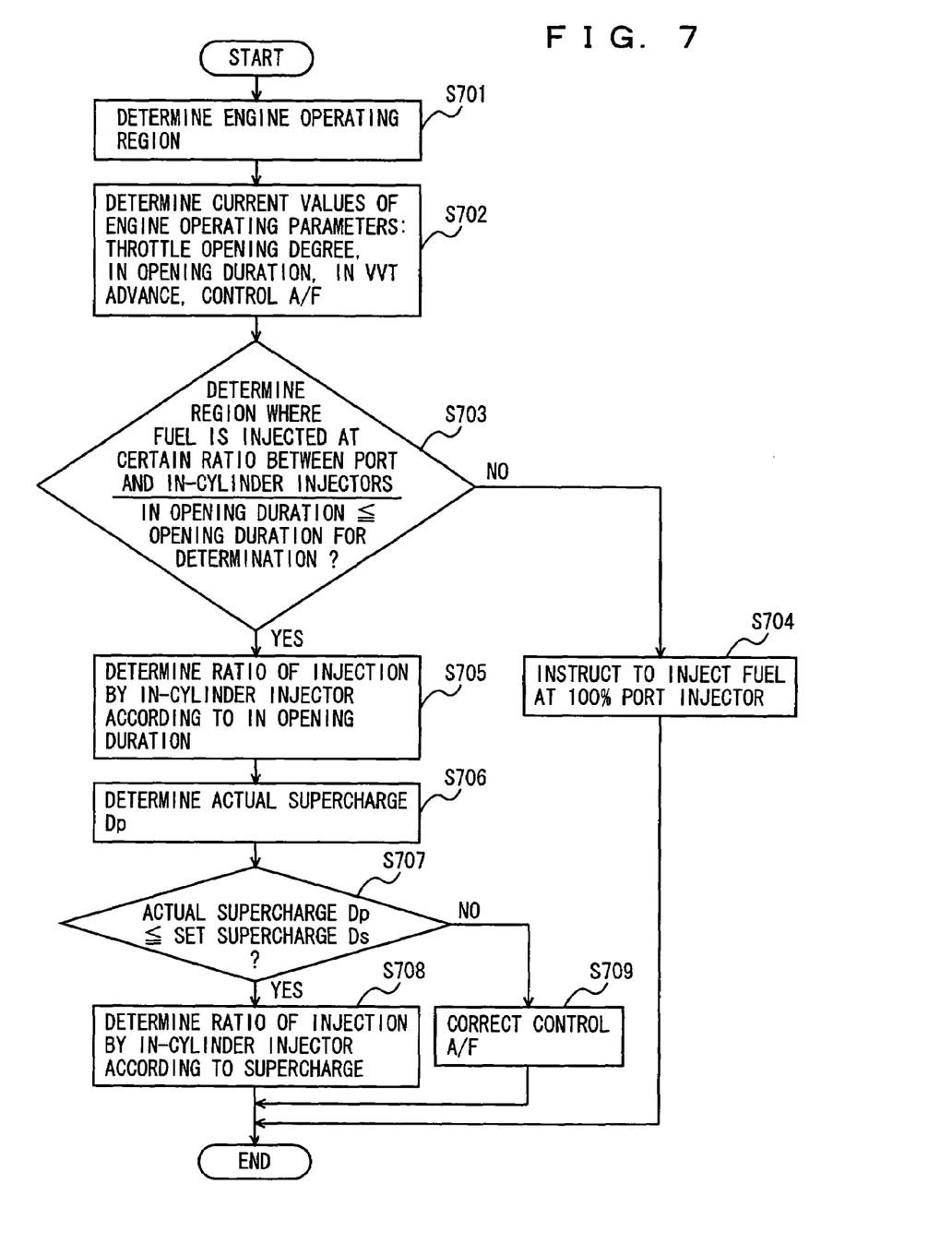
FIG. 7 is a flowchart showing an exemplary control process routine according to the first embodiment of the present invention.

Then, control in the first embodiment of the present invention is now described with reference to the flowchart in FIG. 7 and FIG. 8. FIG. 7 shows a routine of a process for controlling a change of the fuel injection ratio between port injector 110*p* and in-cylinder injector 110*c* performed by ECU 200 of the present embodiment. This process routine is repeated at each predetermined set crank angle.

First, in S701, ECU 200 determines the operating region of the engine from the accelerator depression degree (required load) and the revolution number Ne (revolution speed) based on detection values of accelerator pedal position sensor 152 and crank angle sensor 151 included in the above-described sensors. Further, in the subsequent step S702, from respective detection values of throttle opening position sensor 154, control shaft position sensor 155, intake cam position sensor 156 and exhaust sensor 149, respective current values of engine operating parameters such as the throttle opening degree, the lift or opening duration of intake valve IN, the amount of advance of the open/close timing of intake valve IN, and the control air-fuel ratio (hereinafter control A/F) are determined. The process then proceeds to S703 to determine whether or not the engine state is now in the region where fuel is injected from port injector 110*p* and in-cylinder injector 110*c* at a certain fuel injection ratio. This determination is made according to whether or not the lift or opening duration of intake valve IN for example is equal to or smaller than a predetermined lift or opening duration for determination.

When the result of the determination in S703 is negative (="NO"), namely the valve lift or valve-opening duration is larger than the predetermined lift or opening duration for determination, the process proceeds to S704. Then, according to the basic control described above, 100% of the fuel is injected from port injector 110*p*. In other words, fuel injection from in-cylinder injector 110*c* is stopped, i.e., an instruction is issued to inject fuel at the in-cylinder injection ratio $\alpha$=0%, and this process routine is ended. It is noted that the fuel injection control including the quantity of injected fuel and the timing of fuel injection according to an operating state is carried out through another routine.

When the result of the determination in S703 is positive (="YES"), namely the valve lift or valve-opening duration is smaller than the predetermined valve lift or valve-opening duration for determination, the process proceeds to S705 to determine the ratio of fuel injection by in-cylinder injector $\alpha$ (%). Specifically, according to the lift or opening duration of intake valve IN, in-cylinder fuel injection ratio $\alpha$ is determined (see region (b) in FIG. 8, (B) IN opening duration, (E) fuel injection ratio). Thus, according to a decrease in lift or opening duration, in-cylinder fuel injection ratio $\alpha$ and thus the quantity of fuel injected from the in-cylinder injector are increased. Thus, the increased injection flow compensates for a decrease of tumble flow due to the decrease of the lift or opening duration of the intake valve. Accordingly, the lean limit is kept high and the necessity to set control A/F to be rich is avoided. Supposing that the total quantity of injected fuel that is necessary for an engine operating state is 100% and the ratio of fuel injected by the in-cylinder injector is $\alpha$, the ratio of fuel injected by port injector 110*p* is (100−$\alpha$) (%). Thus, when the ratio of fuel injected from the in-cylinder injector is determined, the ratio of fuel injected from the port injector is uniquely determined. Therefore, in the following description, only the ratio of fuel injected from the in-cylinder injector $\alpha$ is used.

Subsequently, in the present embodiment, after the ratio of fuel injected by the in-cylinder injector, α, is determined according to the lift or opening duration of intake valve IN in S705, the actual supercharge pressure Dp that is the current value of the supercharge pressure is determined from the detection value of supercharge sensor 136 in the following S706. Then, in S707, it is determined whether or not this actual supercharge pressure Dp is larger than a set supercharge pressure Ds which is determined in advance and from which a tumble ratio that is necessary for lean burn (see region (c) in FIG. 8) is obtained. When it is determined that the actual supercharge pressure Dp is smaller than the predetermined set supercharge pressure Ds, namely the result of the determination is positive (="YES"), the process proceeds to S708. Then, according to the magnitude of this actual supercharge pressure Dp, the ratio of fuel injected from the in-cylinder injector, α, is increased. In other words, until the time when the actual supercharge pressure Dp reaches the predetermined set supercharge pressure Ds, the ratio of fuel injected from the in-cylinder injector 110c, α, is increased according to the magnitude of the actual supercharge pressure Dp. In this way, insufficiency of the supercharge pressure is addressed by increasing the in-cylinder fuel injection ratio α and thus increasing the quantity of fuel injected from the in-cylinder injector so as to compensate for insufficiency of the tumble flow by the increased injection flow. Consequently, the lean limit is kept high and the necessity to set the control A/F to be rich is avoided.

When it is determined in S707 that the actual supercharge pressure Dp is larger than the predetermined set supercharge pressure Ds, namely the result of the determination is negative (="NO"), which means that this supercharge pressure allows intake air to be supplied at a sufficient tumble ratio. Then, the process proceeds to S709 without passing through S708. In S709, as shown in FIG. 8, until the actual supercharge pressure Dp for region (c) reaches the predetermined set supercharge pressure Ds, the control to increase the ratio of fuel injected from the in-cylinder injector, α (after the actual supercharge pressure Dp reaches the predetermined set supercharge pressure Ds, the ratio of fuel injected from in-cylinder injector 110c is fixed) as well as a high tumble ratio effected by the supercharge pressure itself when the actual supercharge pressure Dp exceeds the predetermined set supercharge pressure Ds provide a further lean air-fuel ratio. Thus, the control A/F is corrected to be close to lean. Accordingly, the lean burn is maintained, fuel economy is improved and NOx is further reduced.

Figure 8:
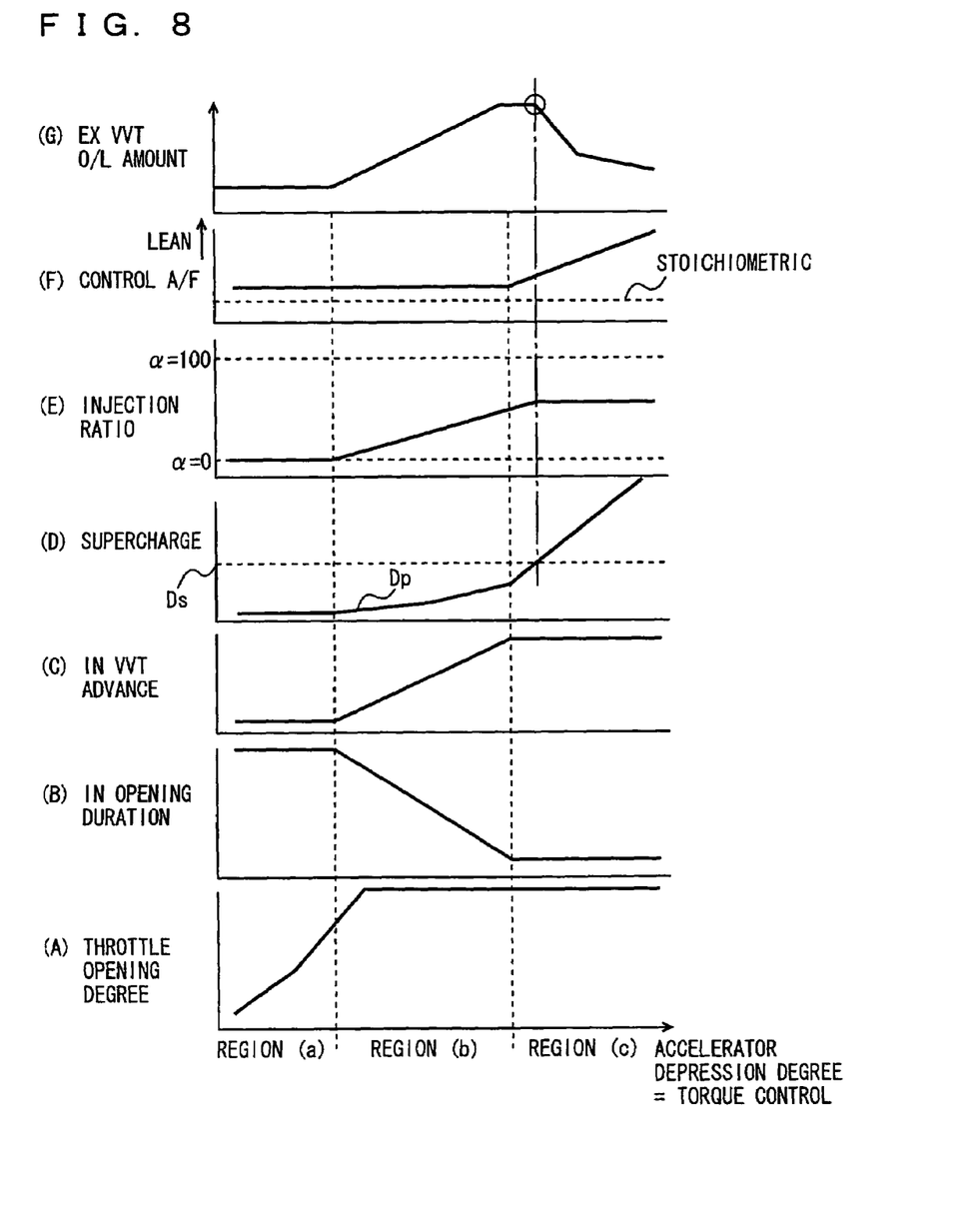
FIG. 8 is a graph illustrating output torque control for a lean-burn region of the supercharger-mounted lean-burn engine in the first and the second embodiments of the present invention.
Figure 9:
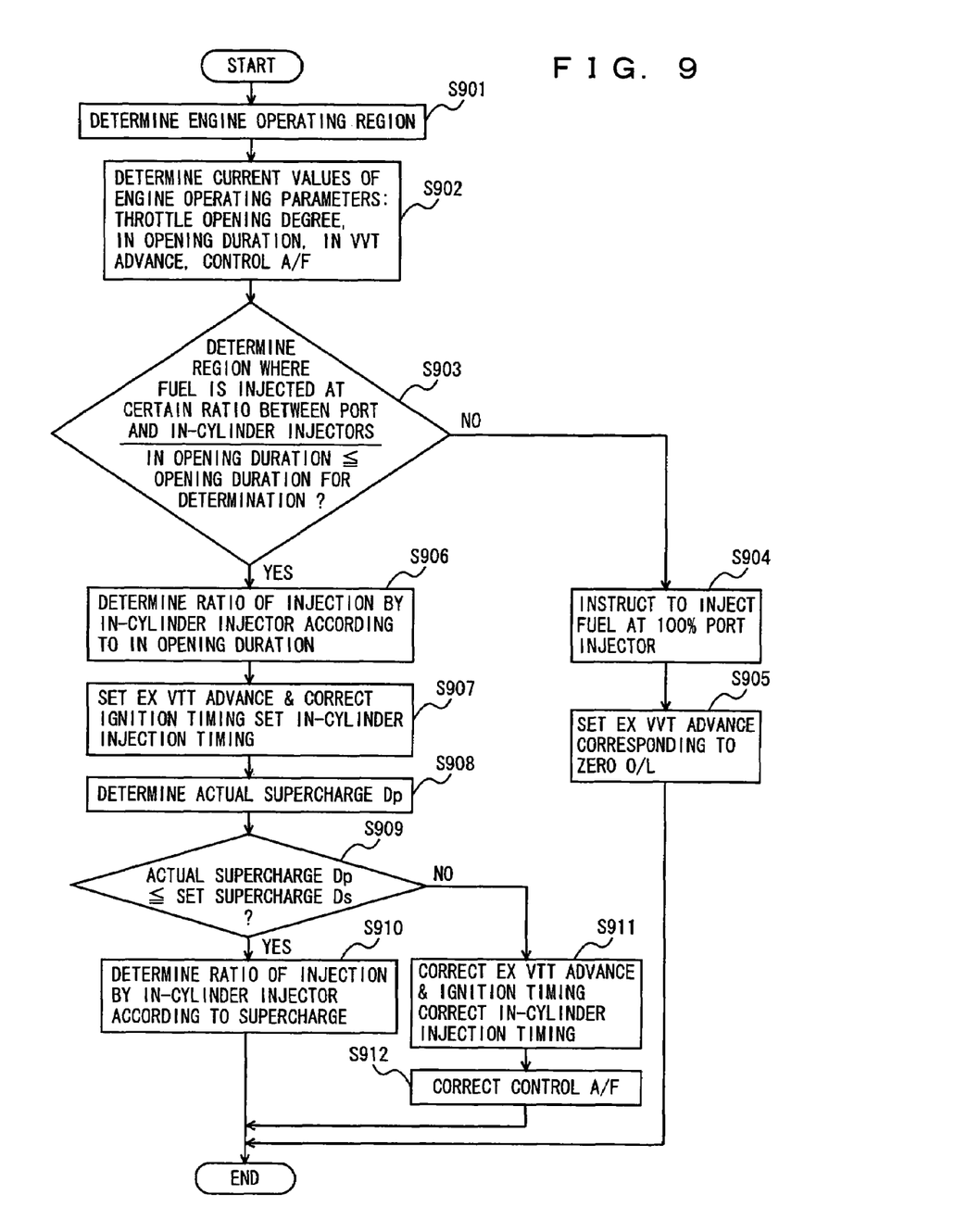
FIG. 9 is a flowchart showing an exemplary control process routine according to the second embodiment of the present invention.

With reference to the flowchart in FIG. 9 and FIG. 8 again, control in the second embodiment of the present invention is described. FIG. 9 is a routine of a process of controlling change in fuel injection ratio between port injector 110p and in-cylinder injector 110c and change in overlap that is performed by ECU 200 of the present embodiment. This process routine is also repeated at each predetermined set crank angle.

Figure 10:
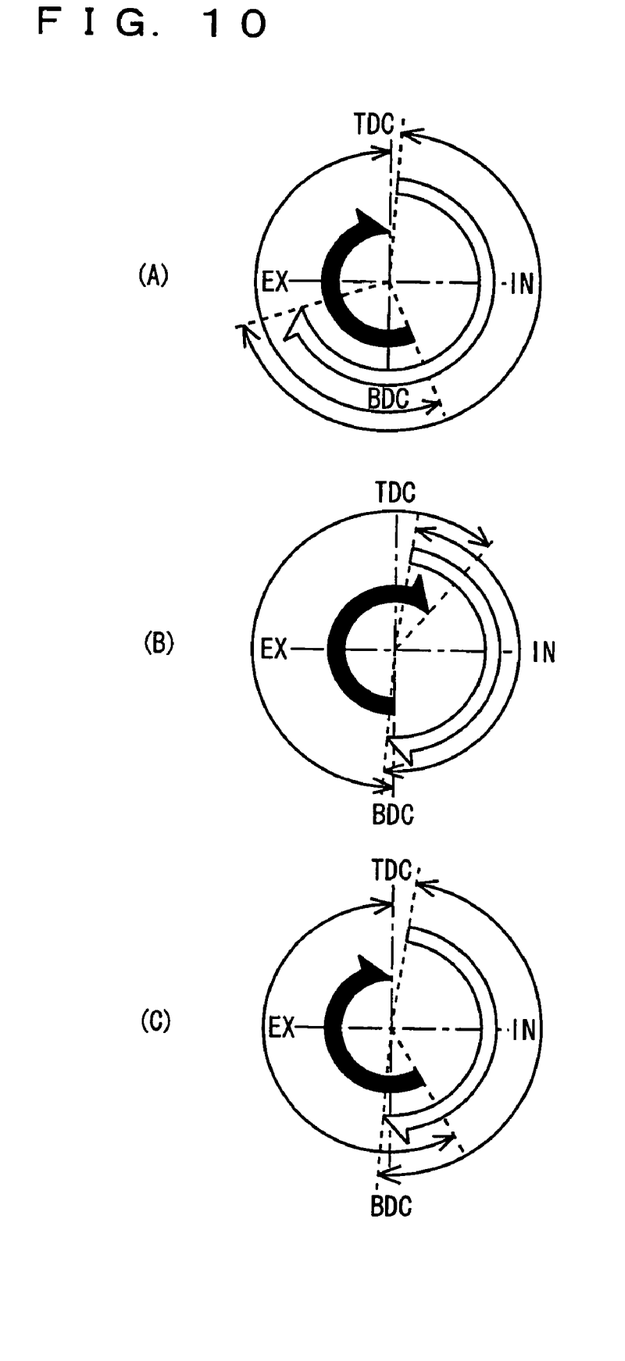
FIG. 10 is a graph showing the valve timing in the second embodiment of the present invention where (A) and (C) correspond to respective valve timings for region (a) and region (c) in FIG. 6, and (B) shows the valve timing in the case where the advance of the open/close timing of an exhaust valve EX is controlled to change the amount of overlap.

In this second embodiment, particularly for region (b) in the above-described first embodiment, the degree of advance of the open/close timing of exhaust valve EX (hereinafter also referred to as EX VVT advance) is further controlled as shown in FIG. 10 to control a change of the overlap (also referred to as O/L amount) and thereby further improve fuel economy and further reduce NOx. Here, (A) and (C) in FIG. 10 correspond respectively to the valve timing for region (a) and region (c) in FIG. 6 discussed above. (B) of FIG. 10 indicates the valve timing in the case where the advance of open/close timing of exhaust valve EX is controlled to change the overlap.

As described above, for region (b), the lift or opening duration as well as the advance of the open/close timing (IN VVT) of intake valve IN are controlled to control the quantity of intake air and thereby control output torque. Here, the close timing of intake valve IN is a control parameter that is important for controlling not only the quantity of intake air but also the actual compression ratio and the tumble ratio. The internal EGR amount to be used for further reducing NOx may be controlled by increasing the amount of valve overlap. In order to increase the valve overlap, the open/close timing of intake valve IN (IN VVT) may be advanced or the open/close timing of exhaust valve EX (EX VVT) may be retarded. However, if the open/close timing of intake valve IN (IN VVT) is advanced for increasing the overlap, the actual compression ratio increases more than necessary in the aforementioned Atkinson cycle, resulting in failure of lean burn due to influences of the ignition timing retard for avoiding knocking or ignition timing retard control for internal EGR correction. In contrast, retard of the open/close timing of exhaust valve EX (EX VVT) for increasing the overlap has less influence on the actual compression ratio and the ignition timing retard may be set only for internal EGR correction, which is advantageous for lean burn. Moreover, the retarded opening of exhaust valve EX provides a high-compression-ratio effect and thus the fuel economy is further improved and NOx is further reduced.

Then, in the second embodiment, in S901 first, the engine operating region is determined from the accelerator depression degree and the revolution number Ne detected from detection values of accelerator pedal position sensor 152 and crank angle sensor 151. Further, in the subsequent S902, from respective detection values of throttle opening position sensor 154, control shaft position sensor 155, intake cam position sensor 156 and exhaust sensor 149, respective current values of such operating parameters are determined as the throttle opening degree, the lift or opening duration of intake valve IN, open/close timing advance of intake valve IN and control A/F. Then, the process proceeds to S903 where according to the determination as to whether or not the lift or opening duration of intake valve IN is equal to or smaller than a predetermined lift or opening duration used for the determination, it is determined whether or not the operating region is in the fuel-injection region where fuel is injected from port injector 110p and in-cylinder injector 110c at a certain fuel injection ratio.

When the result of the determination in S903 is negative (="NO"), namely the lift or opening duration is larger than the predetermined lift or opening duration for the determination, the process proceeds to S904 to issue an instruction to inject fuel at a ratio of 100% of fuel injection from port injector 110p, as described above in connection with the basic control. In other words, an instruction to inject fuel at a ratio of 0% of fuel injection from in-cylinder injector, namely α=0%, is issued. Then, in S905, the open/close timing advance of exhaust valve EX that allows the overlap (O/L) to be zero is determined, and this process routine is ended.

In contrast, if the determination in S903 is positive (="YES") and thus the lift or opening duration is smaller than the predetermined lift or opening duration used for the determination, the process proceeds to S906 to determine the fuel injection ratio α (%) of the in-cylinder injector according to the lift or opening duration of intake valve IN (see region (b) in FIG. 8). Then, in the present embodiment, in order to obtain an amount of overlap (O/L) according to the lift or opening duration of intake valve IN in S907, the advance of the open/close timing of exhaust valve EX (EX VVT) is determined. The ignition timing is corrected to the one appropriate for an amount of internal EGR corresponding to this amount of overlap (O/L). Further, in S907, the fuel injection timing of in-cylinder injector 110c is set to be later than the close timing of exhaust valve EX. Thus, the injection flow from in-cylinder injector 110c after exhaust valve EX is closed provides a high tumble ratio.

Further, in the following S908, from the detection value of supercharge sensor 136, the actual supercharge pressure Dp that is the current value of the supercharge pressure is determined. In S909, it is determined whether or not this actual supercharge pressure Dp is larger than the set supercharge pressure Ds which is determined in advance and from which a tumble ratio necessary for lean burn is obtained (see region (c) in FIG. 8). When it is determined that the actual supercharge pressure Dp is smaller than this predetermined set supercharge pressure Ds, namely the determination is positive (="YES"), the process proceeds to S910 to increase the fuel injection ratio α of in-cylinder injector 110c according to the magnitude of the actual supercharge pressure Dp. Thus, this routine is ended. In other words, until the actual supercharge pressure Dp reaches the predetermined set supercharge pressure Ds, the fuel injection ratio α of in-cylinder injector 110c is increased according to the magnitude of the actual supercharge pressure Dp. In this way, the fuel injection ratio α of the in-cylinder injector and thus the quantity of fuel injected from the in-cylinder injector are increased for addressing shortage of the supercharge pressure. Then, the increased injection flow compensates for the shortage of tumble flow. Consequently, the lean limit is kept high and the necessity to set the control A/F to be rich is avoided.

In contrast, when it is determined in S909 that the actual supercharge pressure Dp is larger than the predetermined set supercharge pressure Ds, namely the determination is negative (="NO"), the supercharge pressure allows intake air to be supplied at a sufficient tumble ratio. Then, the process proceeds to S911 without passing through S910 described above. In S911, as shown in FIG. 8, the fuel injection ratio α of the in-cylinder injector is controlled to increase until the actual supercharge pressure Dp reaches the predetermined set supercharge pressure Ds in region (c) (after the actual supercharge pressure Dp reaches the predetermined set supercharge pressure Ds, the fuel injection ratio α of in-cylinder injector 110c is fixed) and a high tumble ratio is achieved by the supercharge pressure itself when the actual supercharge pressure Dp exceeds the predetermined set supercharge pressure Ds and accordingly the air-fuel ratio can further be made lean. Therefore, with the purpose of reducing the above-described amount of overlap (O/L), the advance of the open/close timing of exhaust valve EX (EX VVT) is corrected so that the ignition timing is any that is appropriate for the amount of internal EGR corresponding to this amount of overlap (O/L). Further, the fuel injection timing of in-cylinder injector 110c is also corrected according to correction of the close timing of exhaust valve EX. Then, in S912, as in the above-described embodiment, the control A/F is further corrected to be leaner. In this way, leaner burn is maintained, fuel economy is increased and NOx is further reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An engine comprising:
   an in-cylinder injector injecting fuel into a cylinder;
   a port injector injecting fuel into an intake manifold;
   a valve-opening-characteristic changing mechanism changing at least one of lift and opening duration of an intake valve; and
   a fuel injection control unit that changes the ratio of fuel injected by the in-cylinder injector and the port injector, when said engine is in a predetermined operating region and said valve-opening-characteristic changing mechanism decreases at least one of the lift and the opening duration of the intake valve, the fuel injection control unit increasing the ratio of fuel injected by said in-cylinder according to an amount of the decrease of at least one of the lift and the opening duration, and decreasing the ratio of fuel injected by said port injector based on an amount corresponding to the increase of the ratio of fuel injected by said in-cylinder injector.

2. The engine according to claim 1, further comprising a supercharger, wherein
   until a supercharge pressure reaches a predetermined pressure, said fuel injection control unit increases the ratio of fuel injected by said in-cylinder injector according to the magnitude of the supercharge pressure.

3. The engine according to claim 2, wherein
   when the supercharge pressure exceeds said predetermined pressure, said fuel injection control unit fixes the ratio of fuel injected by said in-cylinder injector.

4. The engine according to claim 1, further comprising an overlap changing unit increasing, when said engine is in a predetermined operating region and said valve-opening-characteristic changing mechanism decreases at least one of the lift and the opening duration of the intake valve, an amount of overlap by changing open/close timing of an exhaust valve.

5. An engine comprising:
   an in-cylinder injector injecting fuel into a cylinder;
   a port injector injecting fuel into an intake manifold;
   valve-opening-characteristic changing means for changing at least one of lift and opening duration of an intake valve; and
   fuel injection control means that changes the ratio of fuel injected by the in-cylinder injector and the port injector, when said engine is in a predetermined operating region and said valve-opening-characteristic changing means decreases at least one of the lift and the opening duration of the intake valve, the fuel injection control means increasing the ratio of fuel injected by said in-cylinder according to an amount of the decrease of at least one of the lift and the opening duration, and decreasing the ratio of fuel injected by said port injector based on an amount corresponding to the increase of the ratio of fuel injected by said in-cylinder injector.

6. The engine according to claim 5, further comprising a supercharger, wherein
   said fuel injection control means includes means for increasing, until a supercharge pressure reaches a predetermined pressure, the ratio of fuel injected by said in-cylinder injector according to the magnitude of the supercharge pressure.

7. The engine according to claim 6, wherein
   said fuel injection control means includes means for fixing, when the supercharge pressure exceeds said predetermined pressure, the ratio of fuel injected by said in-cylinder injector.

8. The engine according to claim 5, further comprising overlap changing means for increasing, when said engine is in a predetermined operating region and said valve-opening-characteristic changing means decreases at least one of the lift and the opening duration of the intake valve, an amount of overlap by changing open/close timing of an exhaust valve.

9. The engine according to claim 1, further comprising a supercharger, wherein the ratio of fuel injected by the in-cylinder injector is increased as a supercharger pressure becomes higher.

10. The engine according to claim 5, further comprising a supercharger, wherein the ratio of fuel injected by the in-cylinder injector is increased as a supercharger pressure becomes higher.

* * * * *